US011876315B2

(12) United States Patent
Mousa et al.

(10) Patent No.: US 11,876,315 B2
(45) Date of Patent: Jan. 16, 2024

(54) MECHANICAL SHIELDING FOR CIRCUIT COMPONENTS OF A PLUGGABLE NETWORK INTERFACE DEVICE

(71) Applicant: MELLANOX TECHNOLOGIES, LTD., Yokneam OT (IL)

(72) Inventors: Jamal Mousa, Haifa (IL); Nimer Hazin, Ba'ne (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 53 days.

(21) Appl. No.: 17/362,472

(22) Filed: Jun. 29, 2021

(65) Prior Publication Data

US 2022/0360004 A1 Nov. 10, 2022

Related U.S. Application Data

(63) Continuation-in-part of application No. 17/308,807, filed on May 5, 2021.

(51) Int. Cl.

*H01R 12/72* (2011.01)
*H01R 13/6587* (2011.01)
*H01R 12/75* (2011.01)
*H01R 12/70* (2011.01)

(52) U.S. Cl.

CPC ....... *H01R 12/727* (2013.01); *H01R 12/7023* (2013.01); *H01R 12/75* (2013.01); *H01R 13/6587* (2013.01)

(58) Field of Classification Search

CPC .. H01R 12/727; H01R 12/7023; H01R 12/75; H01R 12/725; H01R 12/721; H01R 13/512; H01R 13/502; H01R 13/665; H01R 13/6587

USPC .......... 439/620.22, 620.15, 607.46, 329, 352

See application file for complete search history.

(56) References Cited

U.S. PATENT DOCUMENTS 8,035,975 B2 * 10/2011 Wu .................... H01R 13/6658 361/728
8,206,161 B1 * 6/2012 Lan .................... H01R 13/6658 439/607.22
8,267,713 B2 * 9/2012 Wu .................... H01R 13/6275 439/352
8,740,643 B2 * 6/2014 Kuang ................. H01R 12/721 439/541.5
8,840,432 B2 9/2014 Alden, III et al.

(Continued)

OTHER PUBLICATIONS

Official Action for U.S. Appl. No. 17/308,807, dated Jun. 2, 2022 15 pages.

*Primary Examiner* — Marcus E Harcum

(74) *Attorney, Agent, or Firm* — Sheridan Ross P.C.

(57) ABSTRACT

A pluggable network interface device is provided comprising a split-shell housing having a shielded side portion that protects a side of a circuit substrate disposed in the split-shell housing. The split-shell housing comprises a first shell portion that covers a first side of the circuit substrate and a second shell portion that covers a second side of the circuit substrate that is arranged opposite the first side. The shielded side portion is inset from a width of the split-shell housing and offset a distance from an electrical interconnection end of the circuit substrate. The shielded side portion is arranged at least partially in a notch of the circuit substrate disposed at the electrical interconnection end of the circuit substrate.

20 Claims, 6 Drawing Sheets

(56) References Cited

U.S. PATENT DOCUMENTS 9,017,091 B2 * 4/2015 Zhu .................... H01R 13/512 439/352
9,373,915 B1 6/2016 Schulz et al.
9,437,949 B2 9/2016 Behziz et al.
9,490,588 B2 11/2016 Keyser et al.
9,935,403 B1 * 4/2018 Briant .................. H05K 9/0018
10,104,760 B1 * 10/2018 Briant .................. G02B 6/4284
10,170,862 B2 * 1/2019 Weidner ............. H01R 13/6594
10,283,885 B2 5/2019 Little et al.
10,314,162 B1 6/2019 Oz et al.
10,411,374 B2 * 9/2019 Tanaka ................... H01R 12/53
10,498,085 B2 12/2019 Dill, III
10,535,956 B2 1/2020 Henry et al.
10,559,920 B1 * 2/2020 Champion ........... H01R 12/721
10,777,951 B2 9/2020 Wu et al.
10,916,870 B2 2/2021 Wu et al.
10,916,877 B1 2/2021 Khazen et al.
10,925,159 B2 2/2021 Chen et al.
10,957,997 B2 3/2021 Qiao et al.
11,025,013 B2 6/2021 Little
11,228,123 B2 1/2022 Ayzenberg et al.
11,245,210 B2 2/2022 Ratkovic et al.
11,283,218 B2 3/2022 Qiao et al.
11,545,786 B2 * 1/2023 He ..................... H01R 13/6471
2004/0198079 A1 * 10/2004 Aronson .............. G02B 6/4256 439/76.1
2006/0234556 A1 10/2006 Wu
2007/0155217 A1 7/2007 Wu
2010/0285682 A1 * 11/2010 Wu .................... H01R 13/6275 439/357
2011/0136352 A1 * 6/2011 Liu ....................... G06F 13/409 439/76.1
2011/0306244 A1 * 12/2011 Zhang .............. H01R 13/65914 439/624
2013/0005178 A1 1/2013 Straka et al.
2013/0188325 A1 * 7/2013 Garman ............... H05K 5/0004 29/829
2014/0154895 A1 6/2014 Poulsen et al.
2014/0193993 A1 * 7/2014 Meng ................... H01R 13/633 439/352
2014/0348468 A1 * 11/2014 Lagziel ................ G02B 6/4284 29/825
2014/0349496 A1 11/2014 Zhu et al.
2016/0093966 A1 * 3/2016 Behziz ................... H05K 1/117 439/607.28
2018/0034211 A1 * 2/2018 Little ................. H01R 13/6581
2018/0338387 A1 * 11/2018 Park ..................... G02B 6/4284
2018/0366852 A1 12/2018 Yang
2019/0140374 A1 5/2019 Wu et al.
2019/0260165 A1 8/2019 Below et al.
2019/0356086 A1 11/2019 Smith et al.
2020/0036117 A1 1/2020 Little et al.
2022/0102919 A1 3/2022 Doye
2022/0158390 A1 5/2022 Lee
2022/0159836 A1 5/2022 Neu et al.

* cited by examiner

MECHANICAL SHIELDING FOR CIRCUIT COMPONENTS OF A PLUGGABLE NETWORK INTERFACE DEVICE

CROSS REFERENCE TO RELATED APPLICATION

The present application is a continuation-in-part of U.S. patent application Ser. No. 17/308,807, filed on May 5, 2021, entitled "Systems, Methods, and Devices for Networking Cable Assemblies" the entire disclosure of which is hereby incorporated herein by reference, in its entirety, for all that it teaches and for all purposes.

FIELD

The present disclosure is generally directed to networking cable assemblies and relates more particularly to pluggable network interface devices.

BACKGROUND

Datacenters are the storage and data processing hubs of the Internet. Cable assemblies are used to interconnect network devices and/or network switches within a datacenter to enable highspeed communication between the network switches.

BRIEF SUMMARY

Aspects of the present disclosure include a pluggable network interface device comprising a split-shell housing having a shielded side portion that protects a side of a circuit substrate disposed in the split-shell housing. The split-shell housing comprises a first shell portion that covers a first side of the circuit substrate and a second shell portion that covers a second side of the circuit substrate that is arranged opposite the first side. The shielded side portion is inset from a width of the split-shell housing and offset a distance from an electrical interconnection end of the circuit substrate. The shielded side portion is arranged at least partially in a notch of the circuit substrate disposed at the electrical interconnection end of the circuit substrate.

In one embodiment, a pluggable network interface device is provided that includes a split-shell housing running a first length from a first end to a second end, wherein the second end comprises an open electrical interconnection end for the pluggable network interface device, the split-shell housing comprising: a first shell portion extending the first length and comprising a first cavity running along a portion of the first length; and a second shell portion extending the first length and comprising a second cavity running along a portion of the first length, wherein the first shell portion is joined to the second shell portion, and wherein the first cavity and the second cavity together form a receiving cavity for the split-shell housing; a circuit substrate disposed at least partially within the receiving cavity, wherein the circuit substrate extends a second length from the second end of the split-shell housing, wherein the circuit substrate comprises a notch disposed in a side of the circuit substrate along the second length; and a shield portion extending along the second length from the second end of the split-shell housing and comprising a protrusion that extends into the notch of the circuit substrate toward a center of the circuit substrate.

In an illustrative embodiment, a pluggable network interface device includes a housing running a first length from a first end to a second end, wherein the second end comprises an open electrical interconnection end for the pluggable network interface device, the housing comprising: a first shell portion extending the first length and comprising a first cavity running along a portion of the first length; and a second shell portion extending the first length and comprising a second cavity running along a portion of the first length, wherein the first shell portion is joined to the second shell portion, and wherein the first cavity and the second cavity together form a receiving cavity in the housing; a printed circuit board (PCB) disposed at least partially within the receiving cavity, wherein the PCB extends a second length from the second end of the housing, wherein the PCB comprises a first notched region disposed in a first side of the PCB along the second length and a second notched region disposed in a second side of the PCB along the second length; a first shield portion extending from the second end of the housing and comprising a first protrusion that extends into the first notched region of the PCB toward a center of the PCB; and a second shield portion extending from the second end of the housing and comprising a second protrusion that extends into the second notched region of the PCB toward the center of the PCB.

In an illustrative embodiment, a pluggable network interface module includes a split-shell housing running a first length from a first end to a second end, wherein the second end comprises an open electrical interconnection end for the pluggable network interface module, the split-shell housing comprising: a first shell portion extending the first length and comprising a first cavity running along a portion of the first length; and a second shell portion extending the first length and comprising a second cavity running along a portion of the first length, wherein the first shell portion is joined to the second shell portion, and wherein the first cavity and the second cavity together form a receiving cavity for the split-shell housing; a circuit substrate disposed at least partially within the receiving cavity, wherein the circuit substrate extends a second length from the second end of the split-shell housing, wherein the circuit substrate comprises a notch disposed in a side of the circuit substrate along the second length; and a shield portion disposed on a first width side of the split-shell housing and extending along the second length from the second end of the split-shell housing, the shield portion comprising a protrusion that extends into the notch of the circuit substrate in a direction toward a center of the circuit substrate, wherein the shield portion follows a shape of the notch, and wherein the shield portion is offset from the circuit substrate providing an airflow gap between the shield portion and the notch.

Additional features and advantages are described herein and will be apparent from the following Description and the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1A:
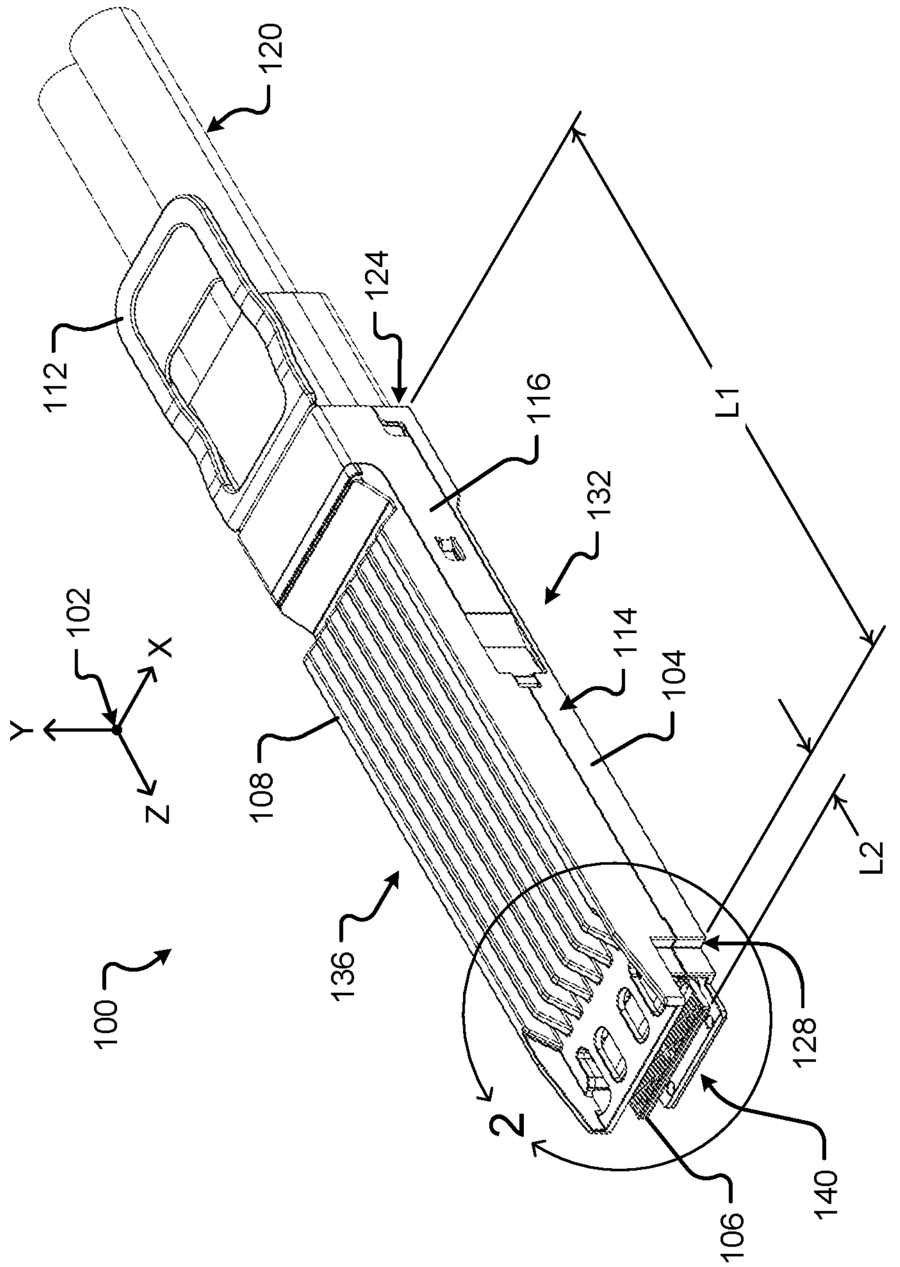
FIG. 1A is a top perspective view of a pluggable network interface device according to at least one embodiment of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Pluggable network interface devices, or pluggable network interface modules, may include a PCB substrate that is partially embedded in a housing. Each pluggable network interface device interconnects (e.g., mechanically and electrically) via an electrical interconnection end of the device. At this end, a portion of the PCB is exposed and unprotected on a number of sides. This exposed portion of the PCB requires that electronics and other sensitive circuit components of the PCB be arranged away from the electrical interconnection end of the pluggable network interface device. As technology surrounding pluggable network interface devices continually progresses, the available space upon which existing or new circuit components may be arranged on the PCB has become limited.

As described herein, the pluggable network interface devices, or modules, may be configured with a suitable form factor, for example, a small form factor pluggable (SFP), SFP+, quad SFP (QSFP), QSFP+, QSFP-double density (QSFP-DD), octal SFP (OSFP), and/or the like.

It is with respect to the above issues and other problems that the embodiments presented herein were contemplated. It is an object the present disclosure to protect components in the area of the exposed PCB portion by extending at least a portion of the backshell (e.g., housing shell portion, etc.) on the sides of the PCB while not affecting the functional aspect of plugging the pluggable network interface device (e.g., OSFP, etc.) backshell into its cage and connector. In one embodiment, the present disclosure provides OSFP backshell mechanical protection for exposed PCB components. Although the OSFP specification does not recommend placing components on the exposed portion of the PCB (e.g., not housed by the backshell, etc.) the OSFP specification allows for such placement. As can be appreciated, this area is important for signal integrity, so the area may be utilized to arrange components as close to the connector pads as possible. However, arranging these components in the exposed PCB portion results in the components not being protected from the sides and, as such, risks that the components may be reached and damaged during operation, connection, handling, and/or the like. In some embodiments, the present disclosure provides a backshell (e.g., one or more split-shell housing portions, etc.) arrangement that provides protection to the exposed PCB from the sides. This arrangement may be somewhat of an OSFP specification violation as the openings in the sides of the PCB and the openings in the top backshell are typically used to channel air to cool the backshells down. In copper OSFP cables the use of these areas to channel air is less significant as the cables produce less heat and the pressure drop by this change is negligible in system level applications. In some embodiments, at least a portion of the OSFP backshell may be extended around the exposed PCB portion while protecting components located at that area, not affecting the functional aspect of plugging the OSFP backshell into its cage and connector. In one embodiment, the backshell may perform as a barrier and protector of the PCB components.

Figure 1B:
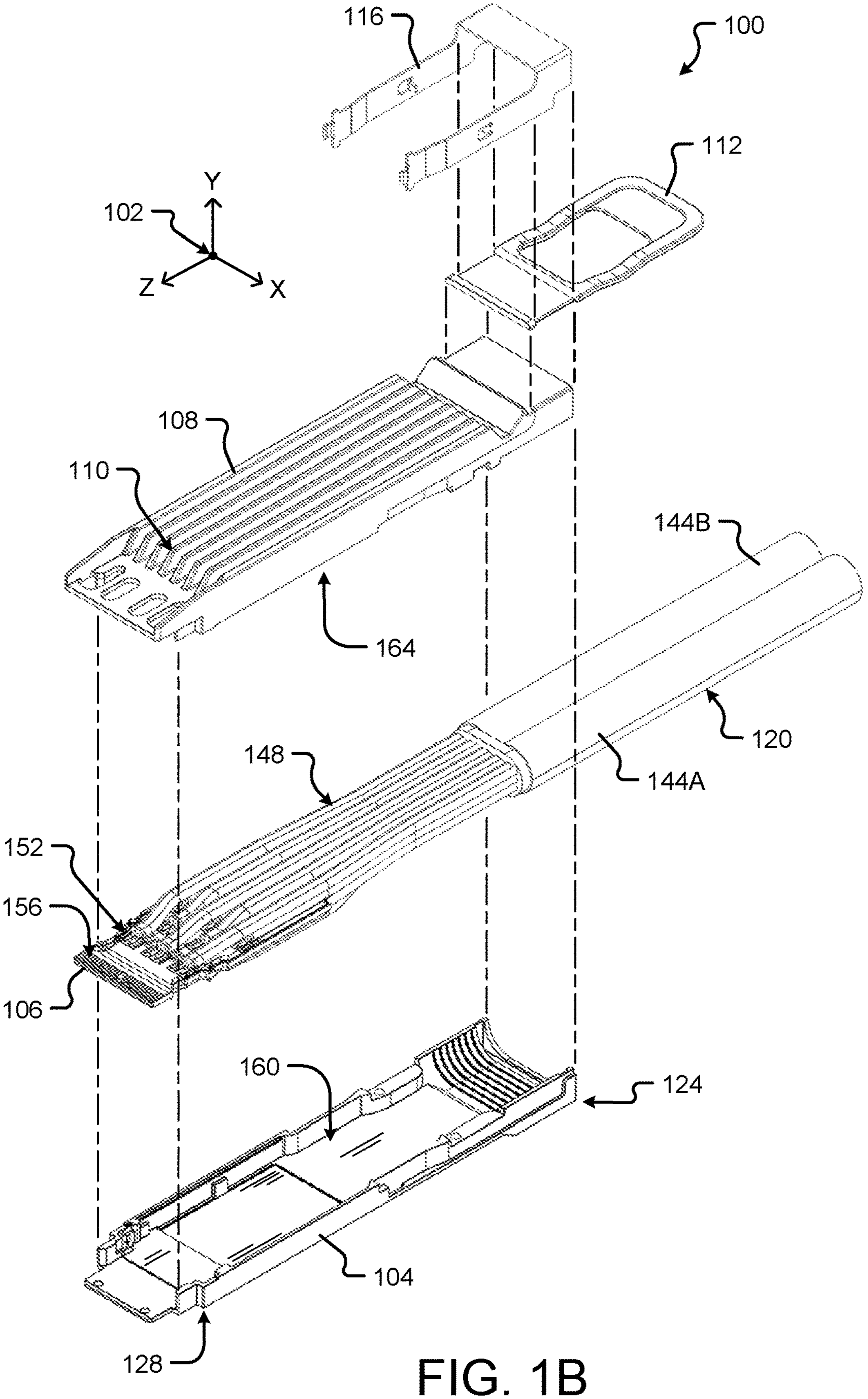
FIG. 1B is an exploded top perspective view of the pluggable network interface device of FIG. 1A.
Figure 1C:
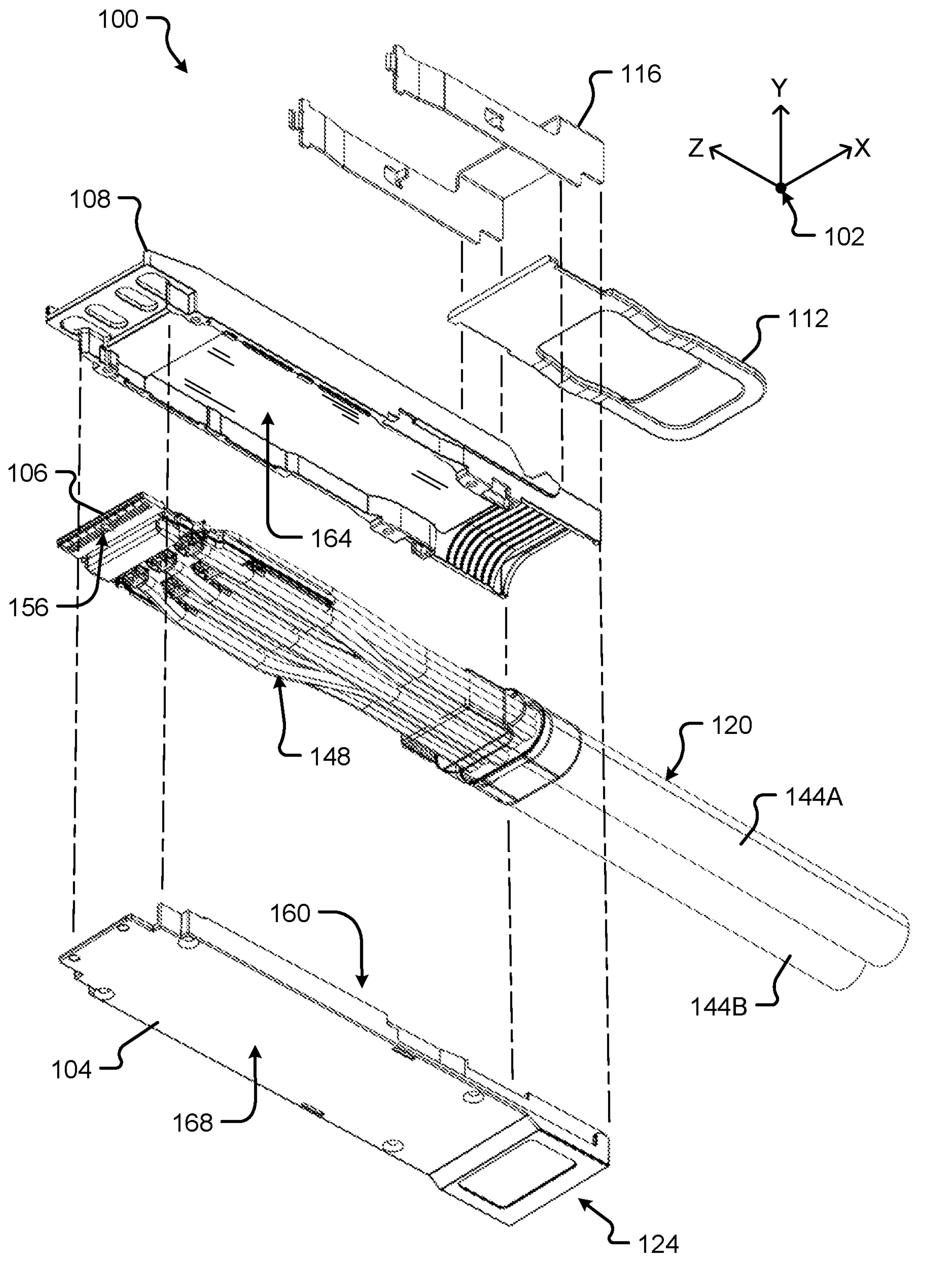
FIG. 1C is an exploded bottom perspective view of the pluggable network interface device of FIG. 1A.

Referring initially to FIGS. 1A-1C, various perspective views of a pluggable network interface device 100, will be described in accordance with embodiments of the present disclosure. The pluggable network interface device 100 may comprise the connector end portion of a direct attach cable (DAC) assembly. In some embodiments, the pluggable network interface device 100 may be referred to as a pluggable network interface module. The pluggable network interface device 100 may comprise one or more cables 120. The cables 120 may comprise one or more copper cables, one or more fiber optic cables, and/or any other suitable cable for transmitting data. In a scenario where the cables 120 include fiber optic cables, the pluggable network interface device 100 may include optical transceivers that convert electrical signals into optical signals and optical signals into electrical signals. In one non-limiting example, the pluggable network interface device 100 may comprise a DAC cable assembly with an OSFP connector form factor. Details of the pluggable network interface device 100 are discussed in more detail below with reference to the figures.

Features of the pluggable network interface device 100 may be described in conjunction with a coordinate system 102. The coordinate system 102, as shown in FIG. 1A, includes three-dimensions comprising an X-axis, a Y-axis, and a Z-axis. Additionally or alternatively, the coordinate system 102 may be used to define planes (e.g., the XY-plane, the XZ-plane, and the YZ-plane) of the pluggable network interface device 100. These planes may be disposed orthogonal, or at 90 degrees, to one another. While the origin of the coordinate system 102 may be placed at any point on or near the components of the pluggable network interface device 100, for the purposes of description, the axes of the coordinate system 102 are always disposed along the same directions from figure to figure, whether the coordinate system 102 is shown or not. In some examples, reference may be made to dimensions, angles, directions, relative positions, and/or movements associated with one or more components of the pluggable network interface device 100 with respect to the coordinate system 102. For example, the width of the pluggable network interface device 100 (e.g., running from the first width side 132 to the second width side 136 of the pluggable network interface device 100) may be defined as a dimension along the X-axis of the coordinate system 102, the height of the pluggable network interface device 100 may be defined as a dimension along the Y-axis of the coordinate system 102, and the length of the pluggable network interface device 100 may be defined as a dimension along the Z-axis of the coordinate system 102.

Although not explicitly illustrated, it should be appreciated that the pluggable network interface device 100 may include processing circuitry and/or memory for carrying out computing tasks, for example, tasks associated with controlling the flow of data over a communication network. The processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on the substrate 106 of the pluggable network interface device 100. The substrate 106 may correspond to a PCB or a collection of PCBs. It should be appreciated that any appropriate type of electrical component or collection of electrical components may be suitable for inclusion in the processing circuitry.

The pluggable network interface device 100 may comprise a housing (e.g., a backshell). The backshell may be in the form of a split-shell housing 114. The split-shell housing 114 may comprise a first shell portion 104 and a second shell portion 108. The first shell portion 104 may be attached to the second shell portion 108 via one or more screws, pins, fasteners, etc. The split-shell housing 114 may house the substrate 106 and may conform to size standards of the form factor being used for the pluggable network interface device 100. For instance, the split-shell housing 114 may be sized in accordance with OSFP standards for a DAC cable assembly. The substrate 106 may comprise a PCB or other suitable substrate for accommodating the form factor of the pluggable network interface device 100.

In one embodiment, a spring clip 116 may contact portions of the first shell portion 104 and/or the second shell portion 108. In some embodiments, the spring clip 116 may retain a pull tab 112 disposed at the first end 124 (e.g., handling end) of the pluggable network interface device 100 adjacent the cables 120. The pull tab 112 may comprise a handle portion and/or aperture that can be grasped when handling, plugging, or unplugging the pluggable network interface device 100 with a receiving connection.

The first shell portion 104 and the second shell portion 108 may extend a first length, L1, from the first end 124 to the second end 128 of the pluggable network interface device 100. A portion of the substrate 106 may extend past the second end 128 of the split-shell housing 114 a second length, L2. In traditional pluggable network interface devices, the substrate 106 (e.g., a PCB) would be exposed along an entirety of the second length, L2, when viewed from the first width side 132 and/or the second width side 136 at the electrical interconnection end 140. In some embodiments, the pluggable network interface device 100 disclosed herein provides a shield portion (e.g., shield portion 204 described in conjunction with FIGS. 2-3D) that extends from the second end 128 of the split-shell housing 114 along the second length, L2, protecting at least a portion of the substrate 106 at the electrical interconnection end 140 along the first width side 132 and the second width side 136.

As shown in the exploded perspective views of FIGS. 1B and 1C, the pluggable network interface device 100 may comprise cables 120 including a first cable 144A and a second cable 144B. The first and second cables 144A, 144B may correspond to a pair of main cables. These cables 144A, 144B may be configured for transporting signals (e.g., optical or electrical data signals). For example, each cable 144A, 144B may include a bundle of cables 148, or plurality of smaller cables, comprising metal wires and/or optical fibers for carrying signals. In one embodiment, each of the bundle of cables 148 may comprise leads that are soldered to contacts of the substrate 106 at one or more solder connection areas 152. The substrate 106 may comprise a number of wires, traces, and/or electrically conductive paths running from one or more of the solder connection areas 152 to the electrical contacts 156 disposed at the electrical interconnection end 140 of the pluggable network interface device 100. A number and configuration of the wires and/or optical fibers in the bundle of cables 148 may vary depending upon the form factor being used for the pluggable network interface device 100. For example, the pluggable network interface device 100 may comprise a DAC cable assembly that conforms to OSFP standards.

Together, the first shell portion 104 and the second shell portion 108 may form the split-shell housing 114 of the pluggable network interface device 100. The first shell portion 104 may comprise a first cavity 160 that receives at least a portion of the substrate 106 and/or the bundle of cables 148. The second shell portion 108 may comprise a second cavity 164 that receives at least a portion of the substrate 106 and/or the bundle of cables 148. The first cavity 160 and the second cavity 164 may form the housing receiving cavity of the split-shell housing 114 and the pluggable network interface device 100. The first shell portion 104 and/or the second shell portion 108 may comprise one or more passive cooling features. For example, as shown in FIG. 1B, the second shell portion 108 may comprise a number of cooling fins 110 arranged adjacent to one another in a width direction of the pluggable network interface device 100 (e.g., along the X-axis direction) and running along the length direction of the pluggable network interface device 100 (e.g., along the Z-axis direction).

FIG. 1C shows an exploded bottom perspective view of the pluggable network interface device 100 in accordance with embodiments of the present disclosure. The pluggable network interface device 100 may comprise a number of surfaces and shapes that aid in connecting the pluggable network interface device 100 to a corresponding receptacle. For instance, the bottom side 168 of the first shell portion 104 may be substantially flat, or planar, allowing the pluggable network interface device 100 to slide on a corresponding receptacle surface when plugging or unplugging the pluggable network interface device 100. The pluggable network interface device 100 may comprise similar surface shapes and features on the sides of the split-shell housing 114. These features may guide the electrical interconnection end 140, and electrical contacts 156, of the pluggable network interface device 100 into a position that is aligned with a corresponding connector when inserted into the corresponding receptacle.

Figure 2:
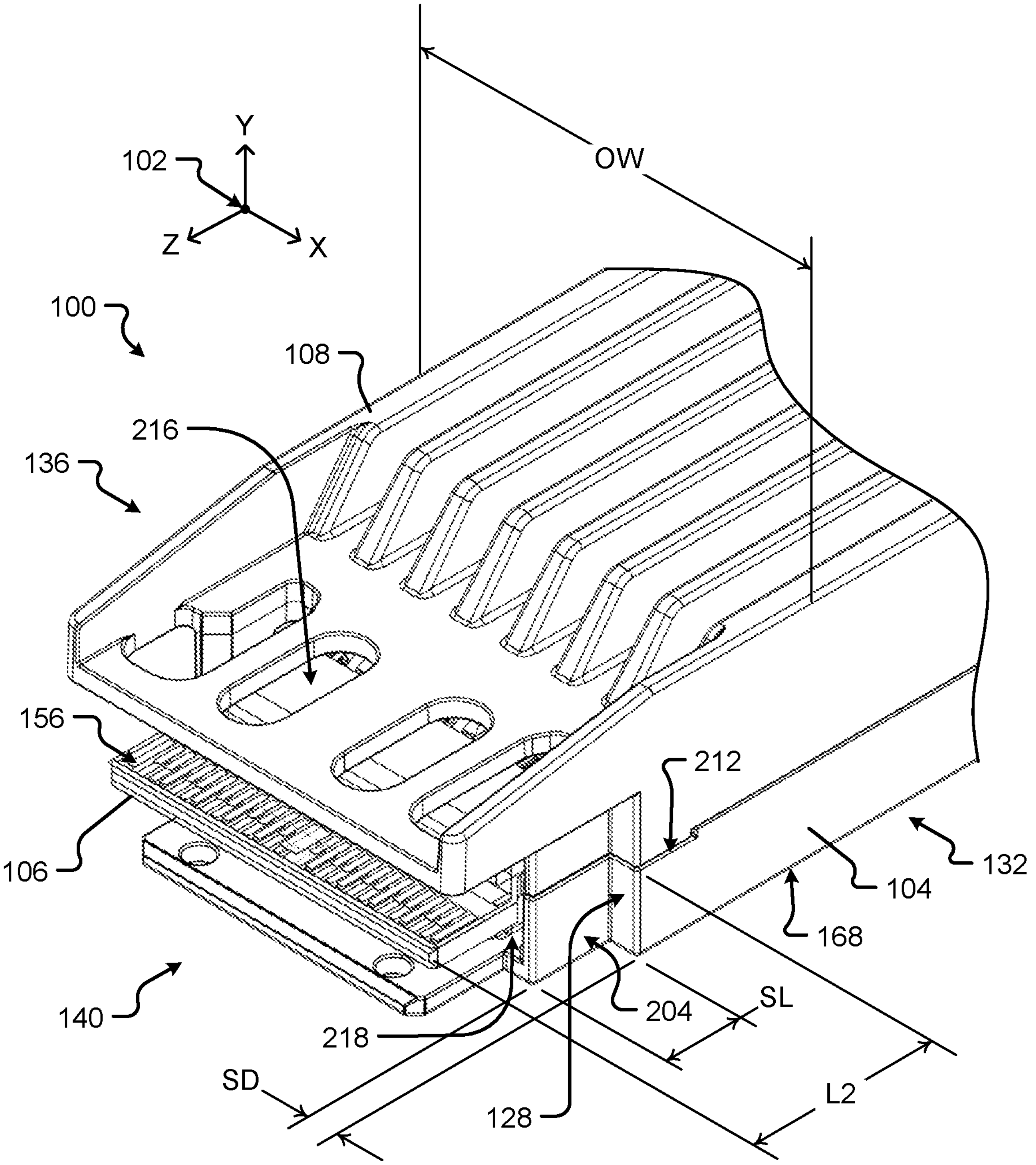
FIG. 2 is a top perspective detail view of an end of the pluggable network interface device taken from circle "2" as shown in FIG. 1A.

FIG. 2 is a top perspective detail view of the electrical interconnection end 140 of the pluggable network interface device 100 taken from circle "2" of FIG. 1A. In some embodiments, the pluggable network interface device 100 may comprise a shield portion 204 that protects, or covers, a portion of the substrate 106 extending from the second end 128 of the split-shell housing 114. For instance, a portion of the substrate 106 may extend a second length, L2, from the second end 128 of the split-shell housing 114. This portion of the substrate 106 is guarded by the first shell portion 104 and the second shell portion 108 from a bottom side 168 and a top side of the pluggable network interface device 100, respectively. In conventional pluggable network interface devices, the housing ends at the second end 128 surface on the sides. However, as shown in FIG. 2, the pluggable network interface device 100 comprises a shield portion 204 that extends along the second length, L2, from the second end 128. The shield portion 204 is inset a step distance, SD, from an outermost width, OW, of the split-shell housing 114. In some embodiments, the outermost width, OW, may define a width of the split-shell housing 114 that is based on a form factor of the pluggable network interface device 100 (e.g., OSFP, etc.). Moreover, while the shield portion 204 extends the shield length, SL, from the second end 128, the shield portion 204 may be arranged to not extend the entirety of the second length, L2. Stated another way, the shield portion 204 length (extending an abbreviated portion of the second length, L2) and inset distance allows access for the electrical contacts 156 of the substrate 106 to engage with the contacts of a receiving connector, while still protecting the circuit components that are disposed behind the electrical contacts 156 (e.g., on the substrate 106 a distance away from the electrical interconnection end 140 of the pluggable network interface device 100).

In some embodiments, the shield length, SL, may correspond to a dimension measured from the second end 128 surface of the split-shell housing 114 (e.g., in the XZ-plane). This dimension may correspond to 5.0 mm, plus or minus 2.0 mm. In one embodiment, the shield length, SL, may be any dimension measured in the range of 3.0 mm to 7.0 mm. For instance, the dimension of the shield length, SL, may correspond to distance of 3.0 mm, 3.5 mm, 4.0 mm, 4.5 mm, 5.0 mm, 5.5 mm, 6.0 mm, 6.5 mm, 7.0 mm, and/or any other measurement between 3.0 mm and 7.0 mm. In some embodiments, the shield length, SL, may be measured as a non-zero length that is a fraction of the second length, L2. The second length, L2, may correspond to a different dimension measured from the second end 128 surface of the split-shell housing 114 (e.g., in the XZ-plane). The second length, L2, may correspond to a distance measured in the range of 8.0 mm to 15.0 mm. Additionally or alternatively, the shield length, SL, may be sized based on the second length, L2, and a required engagement clearance, R, from the electrical interconnection end 140 of the substrate 106 for the electrical contacts 156 (e.g., $SL \leq L2-R$). By way of example, the second length, L2, may correspond to a distance measured to be 9.5 mm (e.g., in the range of 8.0 mm to 15.0 mm) and the required engagement clearance, R, may be at least 3.4 mm. In this example, the shield length, SL, may be any dimension that is greater than zero and that is less than or equal to the second length, L2, of 9.5 mm minus the required engagement clearance, R, of 3.4 mm (e.g., 9.5 mm−3.4 mm=6.1 mm).

In some embodiments, the first shell portion 104 may contact the second shell portion 108 of the split-shell housing 114 along a split line 212. The split line 212 may extend in the XY-plane along at least a portion of the first length, L1, of the split-shell housing 114. The shield portion 204 may be integrally formed in the first shell portion 104, the second shell portion 108, and/or be formed as a separate component (e.g., a plate, etc.) that is attached to one or more of the first shell portion 104 and the second shell portion 108. The shield portion 204 may extend from the first shell portion 104 to the second shell portion 108. As illustrated in FIG. 2, both the first shell portion 104 and the second shell portion 108 comprise a shield portion 204. In this example, the split line 212 continues along the split-shell housing 114 and splits the shield portion 204 of the first shell portion 104 from the shield portion 204 of the second shell portion 108. Additionally or alternatively, the first shell portion 104 may comprise a shield portion 204 disposed on the first width side 132 and an opposite shield portion 204 disposed on the second width side 136. Similarly, the second shell portion 108 may comprise a shield portion 204 disposed on the first width side 132 and an opposite shield portion 204 disposed on the second width side 136. In any event, the shield portion 204 on the first width side 132 and the shield portion 204 on the second width side 136 block a path running from an outside of the split-shell housing 114 to the substrate 106 in the shield length, SL, region of the electrical interconnection end 140. The shield portion 204 may block an entire height running from the first shell portion 104 to the second shell portion 108 in the shield length, SL.

The circuit components (e.g., electronics, traces, etc.) disposed on the substrate 106 may be further protected by at least one shroud 216, 218. These circuit components may be arranged inside the split-shell housing 114 (e.g., between the first width side 132 and the second width side 136 of the pluggable network interface device 100) within the shield length, SL, of the shield portion 204. The shroud may correspond to a cover that surrounds a portion of the circuit components on the substrate 106. Examples of the shroud may include, but are in no way limited to, a bent sheet metal guard that is affixed to the substrate 106, an epoxy covering formed onto the substrate 106 and the circuit components, and/or some other shell or cap that is attached to the substrate 106 and covers the circuit components. More details of the first shroud 216 and the second shroud 218 are described in conjunction with FIGS. 3A-3D.

Figure 3A:
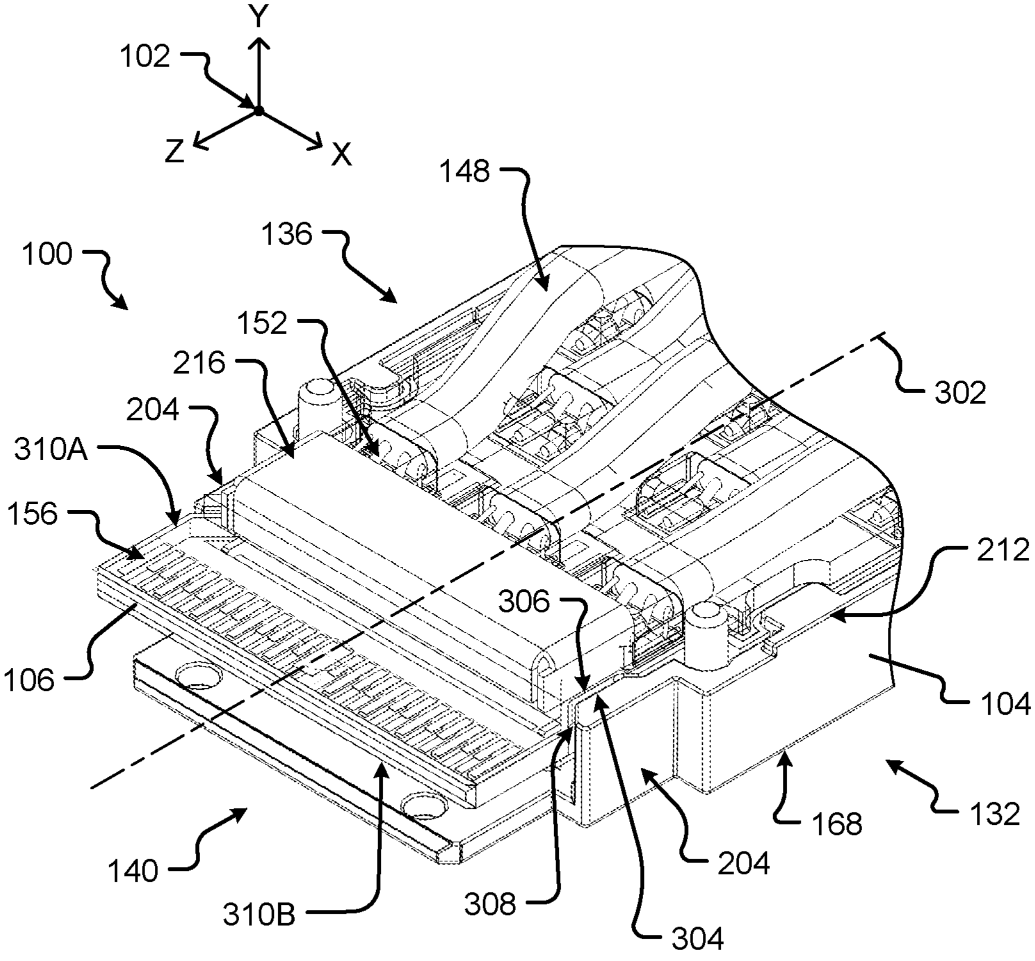
FIG. 3A is a top perspective detail view of the interconnection end of the pluggable network interface device as shown in FIG. 2 with an upper housing portion removed according to at least one embodiment of the present disclosure.
Figure 3B:
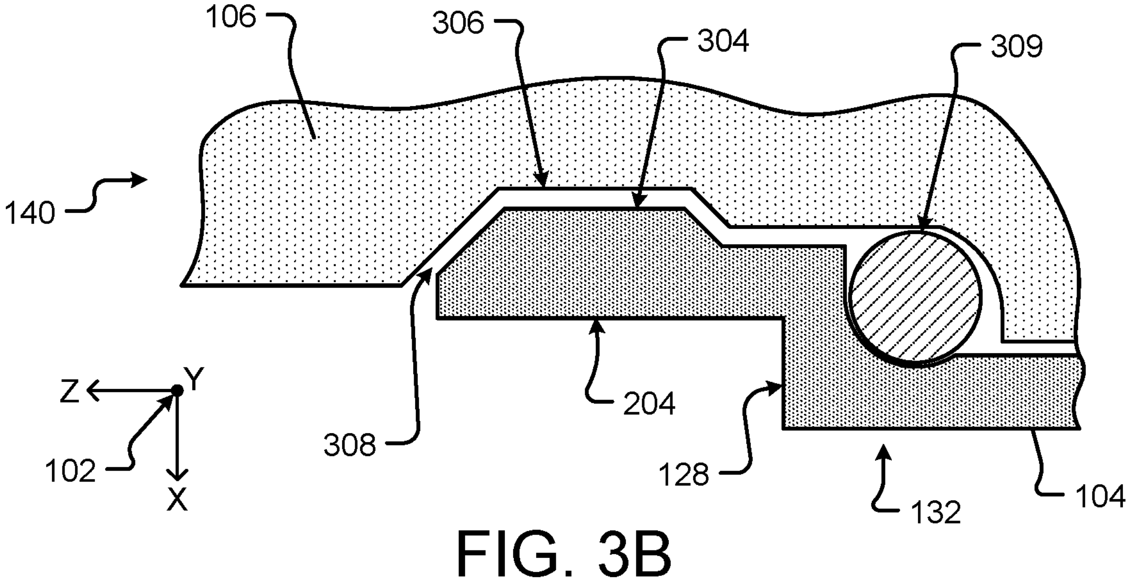
FIG. 3B is a schematic detail section plan view of a shielded region of the pluggable network interface device in accordance with embodiments of the present disclosure.
Figure 3C:
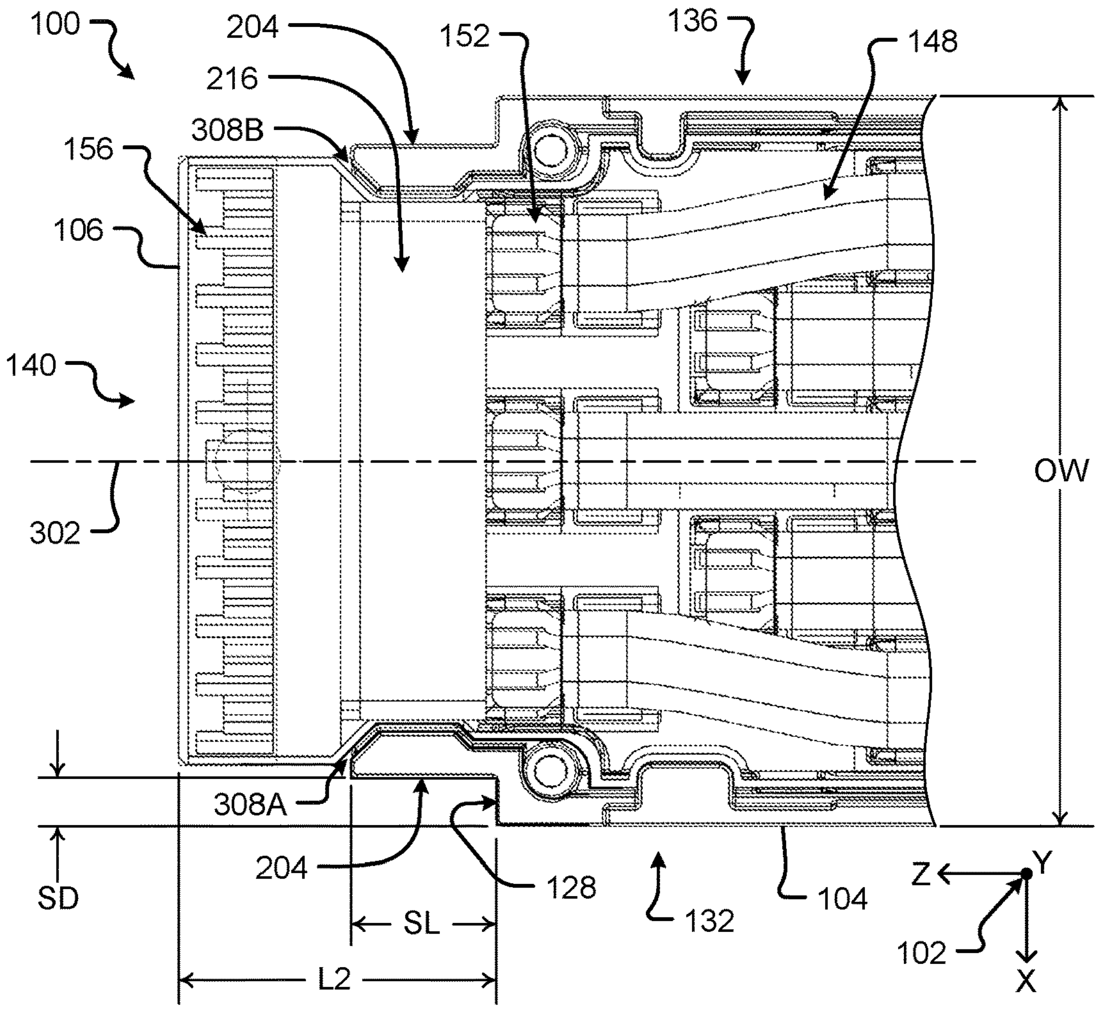
FIG. 3C is a detail plan view of the interconnection end of the pluggable network interface device shown in FIG. 3A in accordance with embodiments of the present disclosure.
Figure 3D:
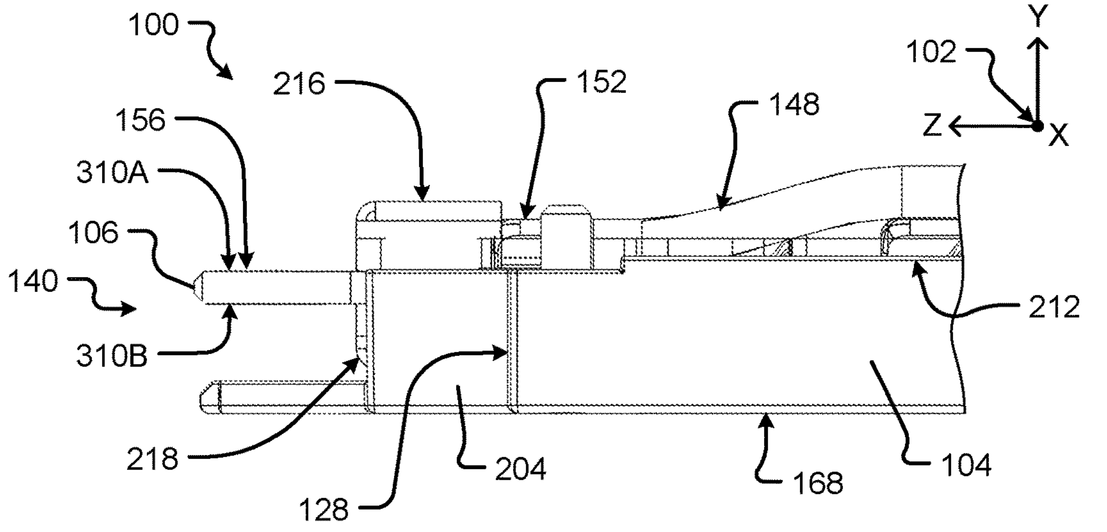
FIG. 3D is a detail elevation view of the interconnection end of the pluggable network interface device shown in FIG. 3C in accordance with embodiments of the present disclosure.

FIGS. 3A-3D show different detail views of the electrical interconnection end 140 of the pluggable network interface device 100 in accordance with embodiments of the present disclosure. FIGS. 3A, 3C, and 3D show the electrical interconnection end 140 of the pluggable network interface device 100 with the second shell portion 108 removed for clarity. FIG. 3B, shows a schematic detail section plan view of a shielded region of the pluggable network interface device 100 in accordance with embodiments of the present disclosure. In some embodiments, several features of the pluggable network interface device 100 may be symmetrical about the device centerline 302. The device centerline 302 may define an axis through which a vertical YZ-plane may run at least from the first end 124 of the split-shell housing 114 to the electrical interconnection end 140 of the pluggable network interface device 100. The device centerline 302 and/or the vertical YZ-plane may define a line of symmetry for features of the pluggable network interface device 100. For example, the shield portion 204 shown on the first width side 132 of the pluggable network interface device 100 may symmetrically mirrored (e.g., from the vertical YZ-plane running through the device centerline 302) to the second width side 136 of the first shell portion 104. In some embodiments, the split line 212 may define a second line of symmetry about which features of the pluggable network interface device 100 may be symmetrical or mirrored. For instance, the split line 212 may define a horizontal XZ-plane separating the first shell portion 104 from the second shell portion 108. In some embodiments, the second shell portion 108 may comprise a shield portion 204 that symmetrical about the split line 212. The shield portion 204 of the second shell portion 108 on the first width side 132 of the pluggable network interface device 100 may also be symmetrically mirrored (e.g., from the vertical YZ-plane running through the device centerline 302) to the second width side 136 of the second shell portion 108.

Referring now to FIG. 3A, a top perspective detail view of the electrical interconnection end 140 of the pluggable network interface device 100 is shown with the second shell portion 108 removed for clarity in disclosure. As shown in FIG. 3A, the substrate 106 comprises a notched cutout, or notch 306, that extends from an outer width of the substrate 106 toward the device centerline 302. The notch 306 is disposed behind the electrical contacts 156 a distance from the electrical interconnection end 140 of the pluggable network interface device 100 or substrate 106. The shield portion 204 comprises a protrusion 304 that extends into the notch 306 in a direction toward the device centerline 302 (e.g., toward a center of the substrate 106). In some embodiments, the protrusion 304 may follow a shape of the notch 306. However, an airflow gap 308 may be disposed between the substrate 106 and the shield portion 204 (e.g., the protrusion 304, etc.). This airflow gap 308 may allow air to move from an exterior of the pluggable network interface device 100 to an interior (e.g., within the cavity of the split-shell housing 114) of the pluggable network interface device 100, or vice versa. Among other things, the airflow gap 308 may allow for cooling, or heat transfer, of the various components of the pluggable network interface device 100.

The first shroud 216 is shown disposed on the first surface 310A of the substrate 106 between the shield portion 204 on the first width side 132 and the shield portion 204 on the second width side 136. In some embodiments, a second shroud 218 may be disposed on the second surface 310B of the substrate 106 to mirror the first shroud 216 (as shown in FIG. 3D). In this case, the substrate 106 may serve as the mirror plane and the second shroud 218 may be further arranged between the shield portion 204 on the first width side 132 and the shield portion 204 on the second width side 136.

FIG. 3B shows a schematic detail section plan view of a shielded region of the pluggable network interface device 100 in accordance with embodiments of the present disclosure. The shield portion 204 comprises a protrusion 304 that extends a distance into the notch 306 of the substrate 106. As illustrated in the schematic view of FIG. 3B, the shield portion 204 includes a protrusion 304 that follows a shape of the notch 306. An airflow gap 308 is disposed between the shield portion 204 and the substrate 106. This airflow gap 308 is also provided between the shield portion 204 and the notch 306. The airflow gap 308 provides a space through which air can pass between the components of the pluggable network interface device 100 aiding in cooling and thermal control of the pluggable network interface device 100.

The first shell portion 104 may comprise a cylindrical body 309 disposed between the first shell portion 104 and the substrate 106. The cylindrical body 309 may correspond to the body of a screw, pin, dowel, shoulder bolt, or fastener of the pluggable network interface device 100. In some embodiments, the cylindrical body 309 may provide a location feature with which the substrate 106 may engage. In one embodiment, the cylindrical body 309 may serve as a retaining feature that prevents the substrate 106 from moving along the Z-axis (e.g., past a specific point, etc.) when the pluggable network interface device 100 is being handled or unplugged. For example, when the split-shell housing 114 of the pluggable network interface device 100 is pulled away from an engaged or connected position, the substrate 106 may move slightly along the Z-axis (e.g., in the XZ-plane) until the cylindrical body 309 contacts a corresponding shape or feature disposed in the substrate 106. This contact between the substrate 106 and the cylindrical body 309 prevents further movement or translation of the substrate 106 relative to the split-shell housing 114 and allows the substrate 106 to be disconnected by manipulating the split-shell housing 114 of the pluggable network interface device 100.

While shown as the shield portion 204 of the first shell portion 104 on the first width side 132 of the pluggable network interface device 100, it should be appreciated that the same, or similar, geometry, spacing, and/or arrangements may apply to any shield portion 204 of the pluggable network interface device 100. For instance, an arrangement of the shield portion 204 shown in FIG. 3B mirrored about the vertical YZ-plane passing through the device centerline 302 may correspond to the shield portion 204 of the pluggable network interface device 100 on the second width side 136. Additionally or alternatively, the arrangement of the shield portion 204 shown in FIG. 3B may be extended in the Y-axis to the shield portion 204 on the first width side 132 that is disposed in a second shell portion 108 of the split-shell housing 114.

FIG. 3C shows a detail plan view of the electrical interconnection end 140 of the pluggable network interface device 100 shown in FIG. 3A in accordance with embodiments of the present disclosure. The detail plan view may correspond to a top view of the pluggable network interface device 100 with the second shell portion 108 removed for clarity in disclosure. As shown in FIG. 3C, the shield portion 204 on the first width side 132 is shown opposing the shield portion 204 on the second width side 136 of the pluggable network interface device 100. The arrangement of the shield portion 204 on the first width side 132 is shown as a mirror of the shield portion 204 on the second width side 136. In some embodiments, the mirror line, or line of symmetry may correspond to the device centerline 302 (e.g., a vertical YZ-plane running through the device centerline 302).

The shield portion 204 on the first and second width sides 132, 136 are each shown inset from the outermost width, OW, of the pluggable network interface device 100 by a step distance, SD. In some embodiments, the shield portion 204 may be inset the step distance, SD, for the entire length of the shield length, SL. As described above, the shield portion 204 may extend into the notch 306 of the substrate 106 and follow a shape of the notch 306. An offset between the shield portion 204 and the substrate 106 is maintained along this region. A first airflow gap 308A is provided between the shield portion 204 and the substrate 106 on the first width side 132 and a second airflow gap 308B is provided between the shield portion 204 and the substrate 106 on the second width side 136.

As described above, the second length, L2, may define a length from the second end 128 of the split-shell housing 114 that the substrate 106 extends in the Z-axis direction (e.g., to the electrical interconnection end 140 of the pluggable network interface device 100). The electrical contacts 156 of the substrate 106 may be disposed on this end portion of the substrate 106 that extends beyond the shield portion 204 on the first width side 132 and the opposing shield portion 204 on the second width side 136. The substrate 106 may remain unprotected (e.g., on the first and second width sides 132, 136) in the space defined from the shield length, SL, to the second length, L2. In some embodiments, this area must be clear of the shield portion 204 to allow the electrical contacts 156 of the substrate 106 to engage with a corresponding connector receptacle.

FIG. 3D shows a detail elevation view of the electrical interconnection end 140 of the pluggable network interface device 100 illustrated in FIG. 3C. The detail elevation view may correspond to a side view of the electrical interconnection end 140 taken from the first width side 132 facing the YZ-plane. The substrate 106 comprises a first surface 310A and a second surface 310B disposed opposite the first surface 310A separated by a thickness of the substrate 106. The second shell portion 108 (not shown in FIG. 3D) may cover a majority of the first surface 310A of the substrate 106 in the XZ-plane while being offset from the first surface 310A by a clearance distance along the Y-axis. The first shell portion 104 may cover a majority of the second surface 310B of the substrate 106 in the XZ-plane while being offset from the first surface 310A by a clearance distance along the Y-axis. In the distance measured from the shield length, SL, to the second length, L2, the substrate 106 is uncovered on the first width side 132 and the second width side 136 by the first shell portion 104, the second shell portion 108, and/or any other portion of the pluggable network interface device 100.

The pluggable network interface device 100 may comprise one or more shrouds 216, 218 disposed on the substrate 106. The shrouds 216, 218 may be formed from sheet metal (e.g., in the form of a bent sheet metal cover or shield), an epoxy, a mold material, and/or material that covers circuit components disposed in the shield length, SL, region of the pluggable network interface device 100 at the electrical interconnection end 140. The first shroud 216 is shown attached to the first surface 310A of the substrate 106. The first shroud 216 may be adhered, fastened, locked (e.g., via tab-and-slot features, tongue-and-groove features, etc.), and/or otherwise affixed to the first surface 310A of the substrate 106. In one embodiment, the first shroud 216 may extend from the notch 306 disposed adjacent to the first width side 132 of the pluggable network interface device 100 to an opposing notch 306 disposed adjacent to the second width side 136 of the pluggable network interface device 100. In some embodiments, the first shroud 216 may be inset from the first airflow gap 308A and the second airflow gap 308B formed between the shield portion 204 on the first width side 132 and the shield portion 204 on the second width side 136, respectively.

The second shroud 218 may be similar, if not identical, to the first shroud 216 in construction. However, the second shroud 218 may be attached to the second surface 310B of the substrate 106. The second shroud 218 may be adhered, fastened, locked (e.g., via tab-and-slot features, tongue-and-groove features, etc.), and/or otherwise affixed to the second surface 310B of the substrate 106. Similar to the first shroud 216, the second shroud 218 may extend from the notch 306 disposed adjacent to the first width side 132 of the pluggable network interface device 100 to an opposing notch 306 disposed adjacent to the second width side 136 of the pluggable network interface device 100. In some embodiments, the second shroud 218 may be inset from the first airflow gap 308A and the second airflow gap 308B formed between the shield portion 204 on the first width side 132 and the shield portion 204 on the second width side 136, respectively. The second shroud 218 may be positioned in a mirrored arrangement to the first shroud 216 (e.g., about the substrate 106).

In some embodiments, the shrouds 216, 218 may not extend past the shield length, SL. In one embodiment, one or more of the shrouds 216, 218 may be used alone or in conjunction with a shield portion 204 of the split-shell housing 114.

The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the foregoing has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

Embodiments include a pluggable network interface device, comprising: a split-shell housing running a first length from a first end to a second end, wherein the second end comprises an open electrical interconnection end for the pluggable network interface device, the split-shell housing comprising: a first shell portion extending the first length and comprising a first cavity running along a portion of the first length; and a second shell portion extending the first length and comprising a second cavity running along a portion of the first length, wherein the first shell portion is joined to the second shell portion, and wherein the first cavity and the second cavity together form a receiving cavity for the split-shell housing; a circuit substrate disposed at least partially within the receiving cavity, wherein the circuit substrate extends a second length from the second end of the split-shell housing, wherein the circuit substrate comprises a notch disposed in a side of the circuit substrate along the second length; and a shield portion extending along the second length from the second end of the split-shell housing and comprising a protrusion that extends into the notch of the circuit substrate toward a center of the circuit substrate.

Aspects of the above pluggable network interface device include wherein the shield portion is disposed on a first width side of the split-shell housing, and wherein the shield portion blocks a path running from an outside of the split-shell housing to the circuit substrate. Aspects of the above pluggable network interface device further comprise: an opposing shield portion disposed on a second width side of the split-shell housing arranged opposite the first width side of the split-shell housing. Aspects of the above pluggable network interface device wherein the shield portion and the opposing shield portion are integrally formed from at least one of the first shell portion of the split-shell housing and the second shell portion of the split-shell housing. Aspects of the above pluggable network interface device include wherein a plurality of electrical contacts are disposed on an end portion of the circuit substrate that extends beyond the shield portion and the opposing shield portion along the second length. Aspects of the above pluggable network interface device include wherein the shield portion follows a shape of the notch, and wherein the shield portion is offset from the circuit substrate providing a gap between the shield portion and the notch. Aspects of the above pluggable network interface device include wherein the shield portion is inset a step distance from an outermost width of the split-shell housing toward the center of the circuit substrate. Aspects of the above pluggable network interface device include wherein the circuit substrate comprises a first surface and a second surface disposed opposite the first surface separated by a substrate thickness of the circuit substrate, wherein the first shell portion covers the second surface of the circuit substrate, and wherein the second shell portion covers the first surface of the circuit substrate. Aspects of the above pluggable network interface device further comprise: a shroud attached to the first surface of the circuit substrate and extending from the notch disposed on a first width side of the circuit substrate to an opposing notch disposed on a second width side of the circuit substrate. Aspects of the above pluggable network interface device further comprise: an opposing shroud attached to the second surface of the circuit substrate and extending from the notch disposed on the first width side of the circuit substrate to the opposing notch disposed on the second width side of the circuit substrate. Aspects of the above pluggable network interface device include wherein the shroud is a bent sheet metal guard affixed to the circuit substrate. Aspects of the above pluggable network interface device include wherein the shroud is an epoxy covering formed onto the first surface of the circuit substrate. Aspects of the above pluggable network interface device include wherein the shield portion is a plate that is attached to at least one of the first shell portion of the split-shell housing and the second shell portion of the split-shell housing from the receiving cavity of the split-shell housing.

Embodiments include a pluggable network interface device, comprising: a housing running a first length from a first end to a second end, wherein the second end comprises an open electrical interconnection end for the pluggable network interface device, the housing comprising: a first shell portion extending the first length and comprising a first cavity running along a portion of the first length; and a second shell portion extending the first length and comprising a second cavity running along a portion of the first length, wherein the first shell portion is joined to the second shell portion, and wherein the first cavity and the second cavity together form a receiving cavity in the housing; a PCB disposed at least partially within the receiving cavity, wherein the PCB extends a second length from the second end of the housing, wherein the PCB comprises a first notched region disposed in a first side of the PCB along the second length and a second notched region disposed in a second side of the PCB along the second length; a first shield portion extending from the second end of the housing and comprising a first protrusion that extends into the first notched region of the PCB toward a center of the PCB; and a second shield portion extending from the second end of the housing and comprising a second protrusion that extends into the second notched region of the PCB toward the center of the PCB.

Aspects of the above pluggable network interface device include wherein the first shield portion and the second shield portion block a path running from an outside of the housing to the PCB. Aspects of the above pluggable network interface device include wherein the first shield portion and the second shield portion are integrally formed from at least one of the first shell portion and the second shell portion of the housing. Aspects of the above pluggable network interface device include wherein a plurality of electrical contacts are disposed on an end portion of the PCB that extends beyond the first shield portion and the second shield portion along the second length, and wherein the first protrusion of the first shield portion follows a shape of the first notched region, wherein the second protrusion of the second shield portion follows a shape of the second notched region, wherein the first protrusion is offset from the PCB providing a first gap between the first shield portion and the first notched region, and wherein the second protrusion is offset from the PCB providing a second gap between the second shield portion and the second notched region. Aspects of the above pluggable network interface device further comprise: a shroud attached to a surface of the PCB and extending from the first notched region to the second notched region of the PCB, wherein the shroud is at least one of a bent sheet metal guard affixed to the PCB and an epoxy covering formed onto the surface PCB.

Embodiments include a pluggable network interface module, comprising: a split-shell housing running a first length from a first end to a second end, wherein the second end comprises an open electrical interconnection end for the pluggable network interface module, the split-shell housing comprising: a first shell portion extending the first length and comprising a first cavity running along a portion of the first length; and a second shell portion extending the first length and comprising a second cavity running along a portion of the first length, wherein the first shell portion is joined to the second shell portion, and wherein the first cavity and the second cavity together form a receiving cavity for the split-shell housing; a circuit substrate disposed at least partially within the receiving cavity, wherein the circuit substrate extends a second length from the second end of the split-shell housing, wherein the circuit substrate comprises a notch disposed in a side of the circuit substrate along the second length; and a shield portion disposed on a first width side of the split-shell housing and extending along the second length from the second end of the split-shell housing, the shield portion comprising a protrusion that extends into the notch of the circuit substrate in a direction toward a center of the circuit substrate, wherein the shield portion follows a shape of the notch, and wherein the shield portion is offset from the circuit substrate providing an airflow gap between the shield portion and the notch.

Aspects of the above pluggable network interface module include wherein the pluggable network interface module is an OSFP device.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

What is claimed is:

1. A pluggable network interface device, comprising:

a split-shell housing running a first length from a first end to a second end, wherein the second end comprises an open electrical interconnection end for the pluggable network interface device, the split-shell housing comprising:

a first shell portion extending the first length and comprising a first cavity running along a portion of the first length; and a second shell portion extending the first length and comprising a second cavity running along a portion of the first length, wherein the first shell portion is joined to the second shell portion, and wherein the first cavity and the second cavity together form a receiving cavity for the split-shell housing;

a circuit substrate disposed at least partially within the receiving cavity, wherein the circuit substrate extends outside of the receiving cavity a second length from the second end of the split-shell housing to an end of the circuit substrate;

a shroud attached to a first surface of the circuit substrate and extending from a point adjacent a first width side of the circuit substrate to an opposing point adjacent a second width side of the circuit substrate;

an opposing shroud attached to a second surface of the circuit substrate and extending from the point adjacent the first width side of the circuit substrate to the opposing point adjacent the second width side of the circuit substrate; and a shield portion extending a shield length from the second end of the split-shell housing along a portion of the second length, wherein the shield length is less than the second length, wherein the shield portion comprises a protrusion that extends in a direction toward a center of the circuit substrate, and wherein a portion of a side of the circuit substrate extending along the second length past the shield length is exposed and uncovered by the shield portion.

2. The pluggable network interface device of claim 1, wherein the shield portion is disposed on a first width side of the split-shell housing, and wherein the shield portion blocks a path running from an outside of the split-shell housing to the circuit substrate along the shield length.

3. The pluggable network interface device of claim 2, further comprising:

an opposing shield portion disposed on a second width side of the split-shell housing arranged opposite the first width side of the split-shell housing, wherein the opposing shield portion extends the shield length from the second end of the split-shell housing.

4. The pluggable network interface device of claim 3, wherein the shield portion and the opposing shield portion are integrally formed from at least one of the first shell portion of the split-shell housing and the second shell portion of the split-shell housing.

5. The pluggable network interface device of claim 4, wherein a plurality of electrical contacts are disposed on a portion of the circuit substrate adjacent the end of the circuit substrate, and wherein the portion of the circuit substrate extends beyond the shield portion and the opposing shield portion along the second length.

6. The pluggable network interface device of claim 1, wherein the shield portion follows a shape of a notch disposed in the side of the circuit substrate, and wherein the shield portion is offset from the circuit substrate along the shield length and providing a gap between the shield portion and the notch.

7. The pluggable network interface device of claim 6, wherein the shield portion is inset a step distance from an outermost width of the split-shell housing toward the center of the circuit substrate.

8. The pluggable network interface device of claim 1, wherein the shroud is a bent sheet metal guard affixed to the circuit substrate.

9. The pluggable network interface device of claim 1, wherein the shroud is an epoxy covering formed onto the first surface of the circuit substrate.

10. The pluggable network interface device of claim 1, wherein the shield portion is a plate that is attached to at least one of the first shell portion of the split-shell housing and the second shell portion of the split-shell housing from the receiving cavity of the split-shell housing.

11. A pluggable network interface device, comprising:

a housing running a first length from a first end to a second end, wherein the second end comprises an open electrical interconnection end for the pluggable network interface device, the housing comprising:

a first shell portion extending the first length and comprising a first cavity running along a portion of the first length; and a second shell portion extending the first length and comprising a second cavity running along a portion of the first length, wherein the first shell portion is joined to the second shell portion, and wherein the first cavity and the second cavity together form a receiving cavity in the housing;

a printed circuit board (PCB) disposed at least partially within the receiving cavity, wherein the PCB extends a second length from the second end of the housing, wherein the PCB comprises a first notched region disposed in a first side of the PCB along the second length and a second notched region disposed in a second side of the PCB along the second length;

a first shield portion extending from the second end of the housing and comprising a first protrusion that extends into the first notched region of the PCB toward a center of the PCB; and a second shield portion extending from the second end of the housing and comprising a second protrusion that extends into the second notched region of the PCB toward the center of the PCB;

wherein the first shield portion and the second shield portion block a path running from an outside of the housing to the PCB, wherein the first shield portion and the second shield portion are integrally formed from at least one of the first shell portion and the second shell portion of the housing, wherein a plurality of electrical contacts are disposed on an end portion of the PCB that extends beyond the first shield portion and the second shield portion along the second length, wherein the first protrusion of the first shield portion follows a shape of the first notched region, wherein the second protrusion of the second shield portion follows a shape of the second notched region, wherein the first protrusion is offset from the PCB providing a first gap between the first shield portion and the first notched region, and wherein the second protrusion is offset from the PCB providing a second gap between the second shield portion and the second notched region.

12. The pluggable network interface device of claim 11, further comprising:

a shroud attached to a surface of the PCB and extending from the first notched region to the second notched region of the PCB, wherein the shroud is at least one of a bent sheet metal guard affixed to the PCB and an epoxy covering formed onto the surface of the PCB.

13. A pluggable network interface module, comprising:

a split-shell housing running a first length from a first end to a second end, wherein the second end comprises an open electrical interconnection end for the pluggable network interface module, the split-shell housing comprising:

a first shell portion extending the first length and comprising a first cavity running along a portion of the first length; and a second shell portion extending the first length and comprising a second cavity running along a portion of the first length, wherein the first shell portion is joined to the second shell portion, and wherein the first cavity and the second cavity together form a receiving cavity for the split-shell housing;

a circuit substrate disposed at least partially within the receiving cavity, wherein the circuit substrate extends outside of the receiving cavity a second length from the second end of the split-shell housing to an end of the circuit substrate, wherein the circuit substrate comprises a first notch disposed in a first side of the circuit substrate along the second length and a second notch disposed in a second side of the circuit substrate along the second length;

a first shield portion disposed on a first width side of the split-shell housing and extending a shield length from the second end of the split-shell housing along a portion of the second length, wherein the shield length is less than the second length, the first shield portion comprising a first protrusion that extends into the first notch of the circuit substrate in a direction from the first width side toward a center of the circuit substrate; and a second shield portion disposed on a second width side of the split-shell housing and extending the shield length from the second end of the split-shell housing, the second shield portion comprising a second protrusion that extends into the second notch of the circuit substrate in a direction from the second width side toward the center of the circuit substrate;

wherein a plurality of electrical contacts are disposed on an end portion of the circuit substrate that extends beyond the first shield portion and the second shield portion along the second length, wherein a portion of the first side of the circuit substrate extending along the second length past the shield length is exposed and uncovered by the first shield portion, wherein the first protrusion follows a shape of the first notch, wherein the second protrusion follows a shape of the second notch, wherein the first protrusion is offset from the circuit substrate providing a first airflow gap between the first shield portion and the first notch, and wherein the second protrusion is offset from the circuit substrate providing a second airflow gap between the second shield portion and the second notch.

14. The pluggable network interface module of claim 13, wherein the pluggable network interface module is an octal small form-factor pluggable (OSFP) device.

15. The pluggable network interface module of claim 13, wherein the first shield portion blocks a path running from an outside of the split-shell housing to the circuit substrate along the shield length.

16. The pluggable network interface module of claim 13, wherein the second shield portion blocks a path running from an outside of the split-shell housing to the circuit substrate along the shield length.

17. The pluggable network interface module of claim 13, wherein the first shield portion and the second shield portion are integrally formed from at least one of the first shell portion of the split-shell housing and the second shell portion of the split-shell housing.

18. The pluggable network interface module of claim 13, wherein the first shield portion and the second shield portion are each inset a step distance from an outermost width of the split-shell housing toward the center of the circuit substrate.

19. The pluggable network interface module of claim 13, further comprising:

a first shroud attached to a first surface of the circuit substrate and extending from the first notch to the second notch.

20. The pluggable network interface module of claim 19, further comprising:

a second shroud attached to a second surface of the circuit substrate, wherein the second surface is arranged opposite the first surface, the second shroud extending from the first notch to the second notch.

* * * * *